June 29, 1926.
W. WURTS
1,590,220
ARTIFICIAL TREE AND SIMILAR STRUCTURE
Filed Feb. 26, 1924   2 Sheets-Sheet 2
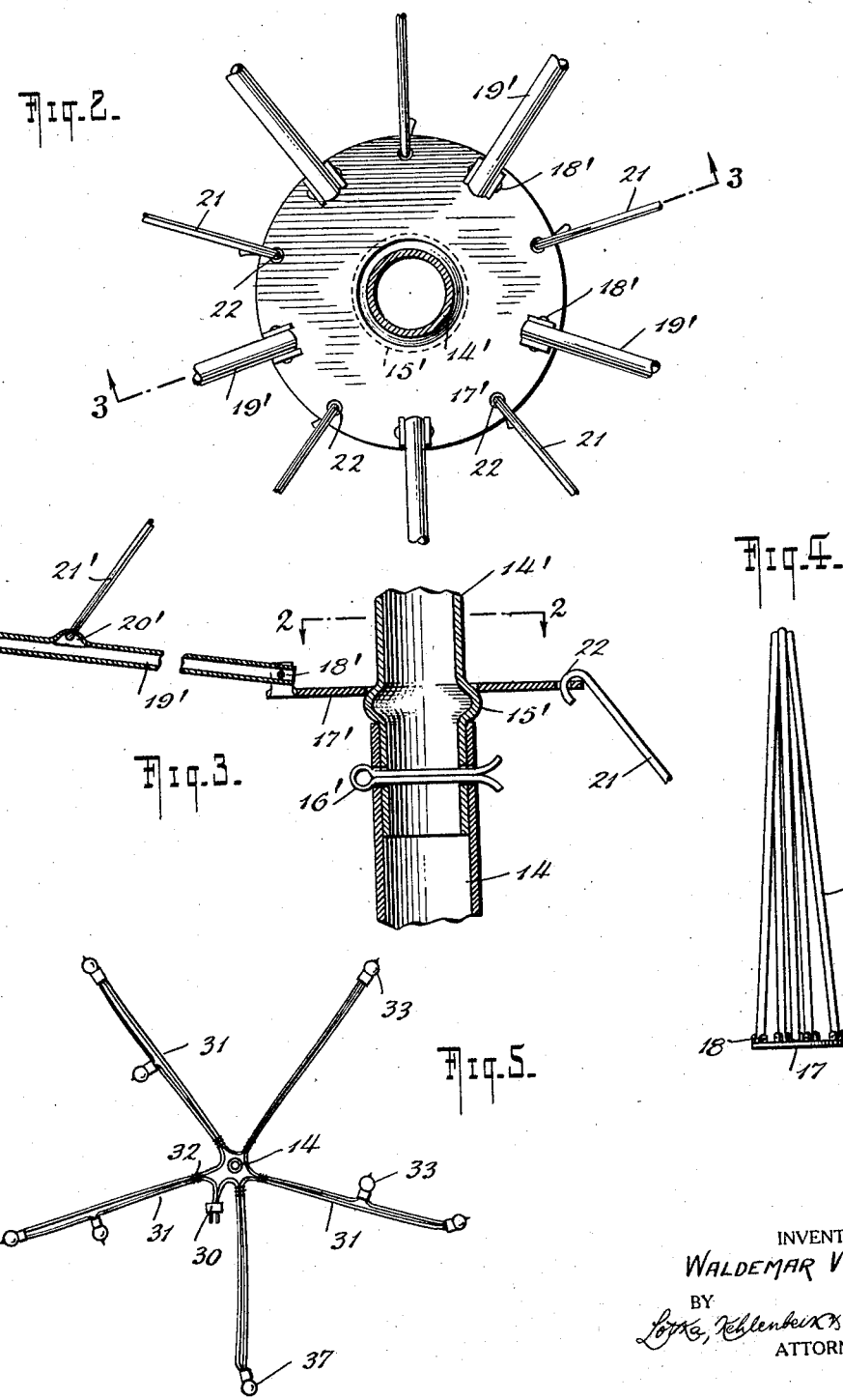
INVENTOR
WALDEMAR WURTS
BY
ATTORNEYS Patented June 29, 1926.

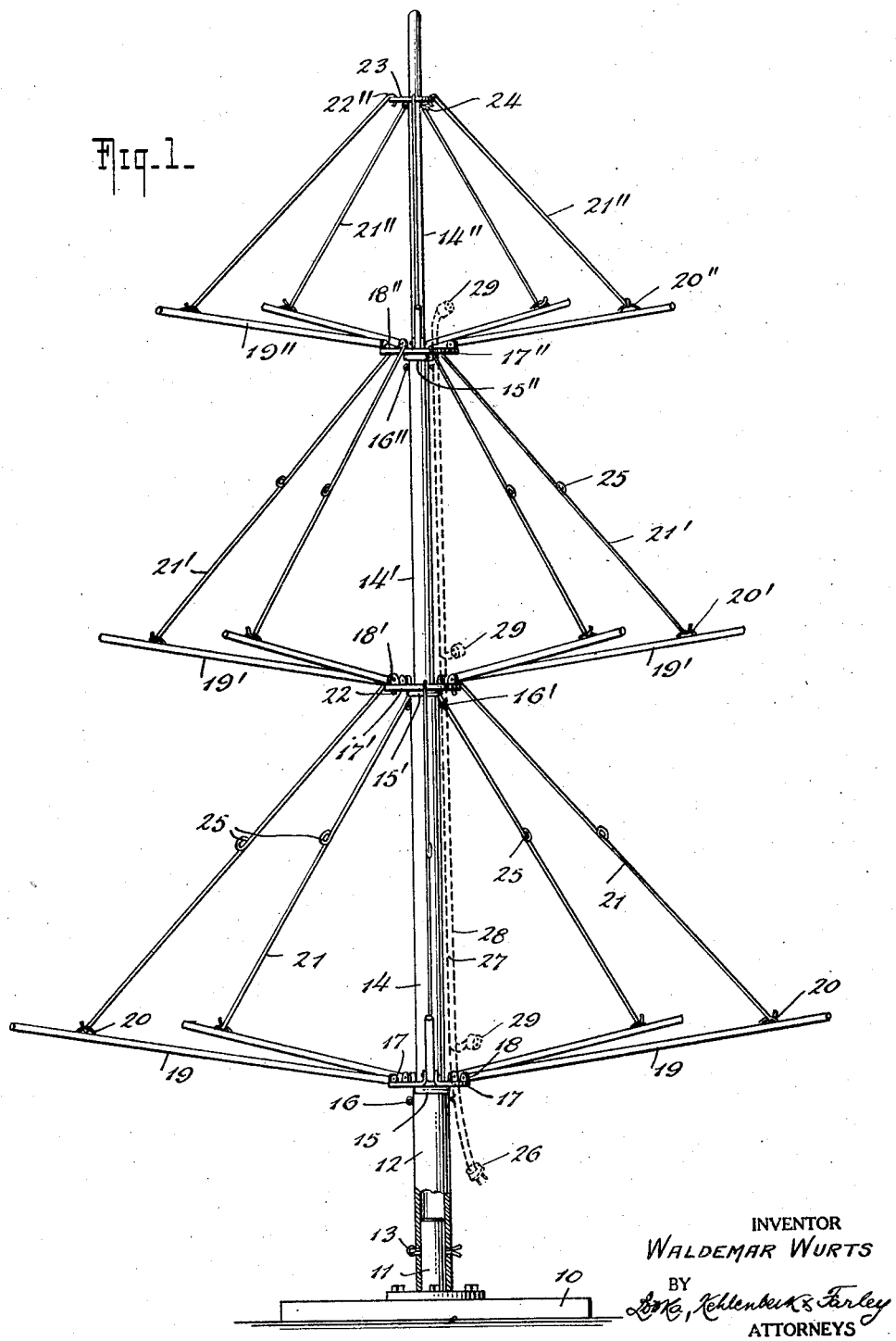

1,590,220

UNITED STATES PATENT OFFICE.

WALDEMAR WURTS, OF EAST ORANGE, NEW JERSEY.

ARTIFICIAL TREE AND SIMILAR STRUCTURE.

Application filed February 26, 1924. Serial No. 695,205.

My invention is primarily designed to afford an attractive, durable, sectional, readily erected and dismembered substitute for the natural Christmas tree. The structure designed by me however lends itself to other uses as well, and I therefore desire it to be understood that I do not wish the scope of the protection limited to an artificial tree.

The various features of my invention will now be described in detail with reference to the accompanying drawings, which are to be taken as showing an illustrative example of my invention, and not as defining its limits.

In said drawings, Fig. 1 is an elevation of an artificial Christmas tree embodying my invention; Fig. 2 is a partial horizontal section, on an enlarged scale, taken on line 2—2 of Fig. 3, the latter being a vertical section on line 3—3 of Fig. 2; Fig. 4 is a side elevation showing one of the tree sections folded for shipping or storing; and Fig. 5 is a plan view of one of the sets or clusters of electric light bulbs and their connections that may be used in connection with my artificial Christmas tree.

The particular tree illustrated comprises a base and three sections. Said base may comprise a board or disk 10 of substantial weight and a central upright post 11 secured thereto, together with a sleeve 12 fastened to said post detachably, as by a cotter pin 13.

The lower section of the tree comprises a central upright 14, which may be made of light yet strong metal tubing of proper diameter to enter the upper end of the sleeve 12 and preferably provided with a stop 15 to limit the downward movement of said upright, which stop may be in the nature of a bead, as shown. Said upright may be locked to the sleeve, if desired, as by means of a cotter pin 16. On the upright 14 is fitted loosely, so that it may slide thereon, a disk 17 to which are pivoted about horizontal, substantially tangential axes 18, a series of arms 19 (five as shown) which normally extend in radial directions, with a slight upward inclination. When the sliding disk 17 and the arms 19 are slipped off the upright 14, they may be folded together until their free ends are in contact with each other, see Fig. 4, thereby bringing these parts into compact shape for packing. Near their free ends, the arms 19 have sockets 20 or other suitable formations for connecting them pivotally with the lower ends of suspension rods 21, the axis of each such pivotal connection being parallel to the pivot axis 18 of the same arm. The connection of said lower ends of the rods 21 is preferably a detachable one, as by forming them with hooks that may be readily inserted in, or removed from, the sockets or eyes 20. Normally, the sliding disk 17 rests on the stop bead 15.

The upper ends of the suspension rods 21 are connected pivotally at 22 with the sliding disk 17′ of the next section of the tree. This section is of the same character as the one described above, except that the dimensions are slightly smaller, the upright 14′ fitting into the upright 14 in the same manner that the latter fits into the sleeve 12. The disk 17′ may be of the same size as the disk 17. The pivotal connections 22 alternate with the pivotal connections 18′, on the disk 17′. Of course, there are no connections such as 22, or rods such as 21, in connection with the lower disk 17, since such rods are to act as suspension members for the arms of the next section below.

The third section is again of a similar construction, but still smaller, so as to produce the upwardly-tapering tree effect. The several parts have been designated by similar reference numerals, and a detailed description of this section will therefore not be necessary. The disk or carrier 17″ may be of the same size as the disks 17 and 17′. The three beads 15, 15′ and 15″ may be of suitable diameters, enabling them to cooperate properly with disks 17, 17′, 17″ having central openings of such size as to properly cooperate with and engage the stops or beads 15, 15′ and 15″. The upper ends of the suspension rods 21″ are connected pivotally at 22″ with a top disk 23 fitted loosely on the upright 14″, said disk being smaller than the others, and having no pivots such as 18, 18′ or 18″, since no arms such as 19 are to be attached to this disk. A cotter pin 24 or other suitable stop on the upright 14″ engages the carrier disk 23 from below, said upright extending above the disk 23 to represent the top of the tree.

Some of the suspension rods are shown as provided with projections 25 to facilitate the hanging of various ornaments on the tree. The sleeve 12 and uprights 14, 14′, 14″ represent the trunk of the tree, while the arms 19, 19′, 19″ represent the branches. Suitable strings or chains of material simulating foliage or the needles of the natural tree would be placed on the arms 19, 19', 19" and on the suspension members 21, 21', 21", some materials obtainable in the market being very suitable for this purpose and presenting a very pleasing and artistic appearance when properly hung on this artificial tree.

The tree described above may be readily lighted by miniature electric bulbs, and the following novel lighting arrangement has been designed to fit the particular construction illustrated: A connector 26 of any well-known or approved character and adapted for attachment to a floor-socket or other source of electric current, supplies such current, through wires 27, 28, to three connectors 29 connected in parallel, that is to say, there is one such connector 29 for each section, or tier of arms. For each of these connectors, there is a cluster or set of the character shown in Fig. 5. The part 30 cooperates with the connector 29, and the single wire 31 is tied at 32 or otherwise formed into a star-shaped figure having five branches in this case, corresponding to the number of the arms 19, 19', or 19". The miniature bulbs 33 are connected in series, and placed at different points of this star-shaped figure. It will be apparent from Figs. 1 and 5 that this electric lighting arrangement can be placed readily on a tree of the character set forth, each of the branches or arms 19 receiving one or more bulbs 33, it being understood that each of the five spoke-like members of the star-shaped arrangement shown in Fig. 5 will be hung upon, or fastened to, one of the arms 19 of the corresponding tree sections. The uppermost cluster may have an extra member to extend along the upright 14" and having a bulb to represent a star at the top of the tree.

It will be noted from Fig. 1 that the arrangement of the arms 19, 19', 19" is staggered, as is also the arrangement of the rods 21, 21', 21". That is to say, the arms 19' of the middle section are not directly above the arms 19 of the lower section, but halfway between them, since the rods 21, linked to said arms 19, are connected with disk 17' between the pivots 18' of the arms 19' (see Figs. 1, 2, and 3). The arms 19" and rods 21" of the upper section, however, are directly above those of the lower section. This staggered arrangement improves the appearance of the tree, and makes it a better imitation of the natural tree.

While the invention has been described in connection with an embodiment intended for use as an artificial Christmas tree, it will be understood that structures of the character set forth might be used for various other purposes.

The device is readily taken apart, packed, shipped, and put together again. The parts 10, 11 would form one unit, or two units, for instance I might use, for the base 10, the cover of the box in which the other parts would be stored and shipped; other units will be formed by the parts 12, 14, 14', and 14" respectively; then there would be three units of the character shown in Fig. 4, one unit 23, a number of rods 21, 21', 21", a wiring unit such as indicated at 26, 27, 28, 29 in Fig. 1, and three lighting units of the type shown in Fig. 5, one of these three units being slightly different, if desired, as explained above. Of course, this statement of units applies only to the specific embodiment illustrated, and it will be understood that various modifications may be made without departing from the spirit of my invention as defined in the appended claim.

The disks and the arms and suspension rods connected therewith can be swung on the central support or trunk, which facilitates the hanging of ornaments or other objects on the structure.

I claim:

An artificial tree comprising a base, a main trunk section detachably fixed upon said base, a plurality of additional trunk sections detachably fitted into each other and detachably mounted upon said main trunk section, said trunk sections together constituting the trunk of the tree, means for preventing said trunk sections from rotating relatively to each other and to said base, stops formed on said additional trunk sections for arresting the adjustment of said trunk sections into each other and for supporting them upon each other, disks loosely mounted upon said additional trunk sections and rotatable upon said stops about the axis of said trunk, arms pivotally attached at one of their ends to said disks and constituting the branches of the tree and suspension members extending from the arms of one disk to the next higher disk and connected therewith at points between the pivots of its arms.

In testimony whereof I have signed this specification.

WALDEMAR WURTS.